Dec. 5, 1944.    M. S. BURGESS    2,364,190
MEASURING SYSTEM AND CIRCUIT
Filed Oct. 29, 1941    5 Sheets-Sheet 2

INVENTOR
M. S. BURGESS
BY
ATTORNEY

Dec. 5, 1944.   M. S. BURGESS   2,364,190
MEASURING SYSTEM AND CIRCUIT
Filed Oct. 29, 1941    5 Sheets-Sheet 3

INVENTOR
M. S. BURGESS
BY
*C. S. Sprague*
ATTORNEY

Dec. 5, 1944.      M. S. BURGESS      2,364,190
MEASURING SYSTEM AND CIRCUIT
Filed Oct. 29, 1941      5 Sheets-Sheet 5

PS=23.00 DIV.

PS=26.00 DIV.

PS=36.33 DIV.

PS=6.66 DIV.

PS=9.66 DIV.

INVENTOR
M.S. BURGESS
BY
*C. A. Sprague*
ATTORNEY

Patented Dec. 5, 1944

2,364,190

UNITED STATES PATENT OFFICE 2,364,190

MEASURING SYSTEM AND CIRCUIT

Montague S. Burgess, Queens Village, N. Y., assignor to Bell Telephone Laboratories, Incorporated, New York, N. Y., a corporation of New York Application October 29, 1941, Serial No. 416,987

8 Claims. (Cl. 178—69)

This invention relates to measuring methods and particularly to methods of determining the phase relationship between two electrical waves. A preferred form of the invention relates to measuring the envelope delay of a transducer.

It is the principal object of this invention to provide novel methods of and apparatus for determining the phase relationship between two electric waves at least one of which is a modulated wave at the time the comparison is made. It is to be understood that whenever, in the specification and claims, reference is made to the phase of a modulated wave or to the phase relationship between a modulated wave and an unmodulated wave, it is the phase of the envelope of the modulated wave or the phase relationship between the envelope of the modulated wave and an unmodulated wave that is being referred to and not the phase of the carrier or the phase relationship between the carrier and the unmodulated wave.

It is another object of this invention to provide methods of measuring the envelope delay of a transducer by determining the phase relationship between two electrical waves transmitted over the transducer at least one of the waves being a modulated wave at the time the phase comparison is made.

Envelope delay is by definition the slope of a phase vs. frequency curve, $$\frac{d\beta}{d\omega}$$

The quantity $$\frac{d\beta}{d\omega}$$

can be expressed by the following equation:

$$\frac{d\beta}{d\omega} = T + \omega \frac{dT}{d\omega} \quad (1)$$

where T is the phase delay $$\left(\frac{\beta}{\omega}\right)$$

From the standpoint of telephotography and television (systems which by their nature have stringent delay requirements) the transient nature of the phenomena involved is such that all of this equation must be considered. Only when measurements over certain parts of the frequency range are required and it is known that T differs from the envelope delay by some small quantity which is within the accuracy desired, should phase delay be used to replace envelope delay. In actual practice, $$\frac{d\beta}{d\omega}$$

is not actually measured, the quantity measured being $$\frac{\Delta\beta}{\Delta\omega}$$

which is sufficiently accurate for practical purposes. This measured quantity may be thought of as the true value of $$\frac{d\beta}{d\omega}$$

at a frequency differing from the carrier by an amount equal to the modulating frequency.

$$\frac{\Delta\beta}{\Delta\omega}$$

is obtained in the various embodiments of the present invention by fixing the frequency difference and measuring the corresponding phase change. Reference is made to a paper entitled "Measurement of phase distortion," by Nyquist and Brand, published in the Bell System Technical Journal, July 1930, volume IX, commencing on page 522, which deals with the measurement of phase distortion or delay distortion and is particularly concerned with measurements in telephone circuits. For this purpose use is made of the above-mentioned quantity "envelope delay" which is defined therein as the first derivative of the phase shift with respect to frequency.

The present invention relates in one of its aspects to methods of measuring envelope delay of straightaway television circuits, each employing a single non-reversible line, that is, a circuit which is capable of transmitting waves in one direction only, differing in this respect from the invention described in the copending application of the same inventor, Serial No. 376,976, filed February 1, 1941, patented December 28, 1943, No. 2,337,540, wherein the circuit necessarily includes a reversible line, that is, a line which is capable of transmitting waves in either direction. In each of the embodiments of the present invention, the envelope delay of a transducer is obtained by the phase comparison of two transmitted modulated waves which are not demodulated at the receiving station or by the phase comparison of two transmitted waves one of which remains modulated and the other of which is either demodulated or transmitted over the transducer to the receiving station without modulation, thus differing in this respect from the copending application of the same inventor, Serial No. 400,289, filed June 28, 1941, patented December 28, 1943, No. 2,337,541, wherein the envelope delay of the circuit is obtained by applying two modulated waves to the transducer intermittently, demodulating these at the receiving end of the line, and determining the phase relationship between the two demodulated waves which waves are of the same frequency or it is obtained by transmitting a modulated wave which is demodulated after transmission and phase compared with a wave which is transmitted as a sinusoidal wave, the phase comparison between the sinusoidal wave and the demodulated wave being made at the receiving station.

An important feature of each of the methods of the present invention is that one or both transmitted modulated waves may be used at the sending or the receiving station for phase comparison purposes without demodulating this wave or waves.

In accordance with one embodiment of the invention, chosen by way of example for purposes of illustration, the envelope delay of a single non-reversible line or other transducer is obtained by transmitting over the transducer a modulated wave (which will be designated the "first" wave and which is produced by modulating a wave of the measuring frequency, that is, a frequency which is constant during a given set of readings taken to provide data for determining the envelope delay at that particular value of frequency but which is adapted to be varied to measure the envelope delay at other frequencies, with a wave of fixed frequency) and a second wave which is sinusoidal and of the fixed frequency. These waves are phase compared without demodulation of the first, or modulated, wave. The modulated wave is applied to the vertical plates and the sinusoidal wave is applied to the horizontal plates of a cathode ray oscillograph, these two waves being applied simultaneously for a brief interval of time. During the next succeeding time interval of the same length, the energy of the sinusoidal wave is divided between two paths for application to both sets of plates of the oscillograph. When the two sinusoidal waves caused by the division are in phase with each other a straight line pattern results on the screen of the oscillograph. During this same interval, a relay operates to reverse the phase of the sinusoidal wave which is applied to one of the sets of plates. The net result is two intersecting straight lines on the screen which are used as a reference pattern. During the next interval of time the waves which were first applied (that is, the modulated wave and the sinusoidal wave) again are applied to the pattern. This intermittent action gives a combined picture of the two intersecting straight lines superimposed on the pattern of the modulated wave having a sinusoidal time base. The envelope of the modulated wave contains two straight line edges having slopes similar to those of the two intersecting lines. By matching the edges of the envelope pattern, by means of the adjustments of phase shifters, with those of the two intersecting lines, the phase difference or delay can be determined. Readings of the phase shifters are utilized to compute the envelope delay for the particular value of measuring frequency.

In another embodiment of the invention, the envelope delay of the transmission line is measured by the phase comparison of two modulated waves (the first produced by modulating a wave of measuring frequency with a wave of fixed frequency and the second produced by modulating a wave of a standard frequency with a wave of said fixed frequency) which are transmitted over the line and applied without demodulation to a cathode ray phase comparer. The phase comparer preferably comprises a cathode ray tube with two electron guns and two complete sets of four deflecting plates each, one set for each of the two beams, the patterns produced by the two beams being superimposed either on the screen of the tube or a screen external thereto. The modulating waves are respectively applied to one pair of plates of each set, while a sinusoidal wave of the fixed frequency is applied to the other pair of plates of each set. Phase shifters are utilized until predetermined patterns are obtained on the screen, the readings of the phase shifters being utilized to compute the envelope delay of the line at the particular value of measuring frequency.

In both of these embodiments, a modulated wave is applied directly to a pair of cathode ray deflecting plates and a sinusoidal wave of the same frequency as the envelope of the modulated wave is applied to the pair of deflecting plates having an axis at right angles to that of the first pair. This feature, while useful in the measurement of envelope delay, has broader applications than delay measurements; for example, it may be used in the phase comparison of an input wave and the envelope of the output wave of a modulator.

The invention will be more readily understood by referring to the following description taken in connection with the accompanying drawings forming a part thereof in which.

Figure 1:
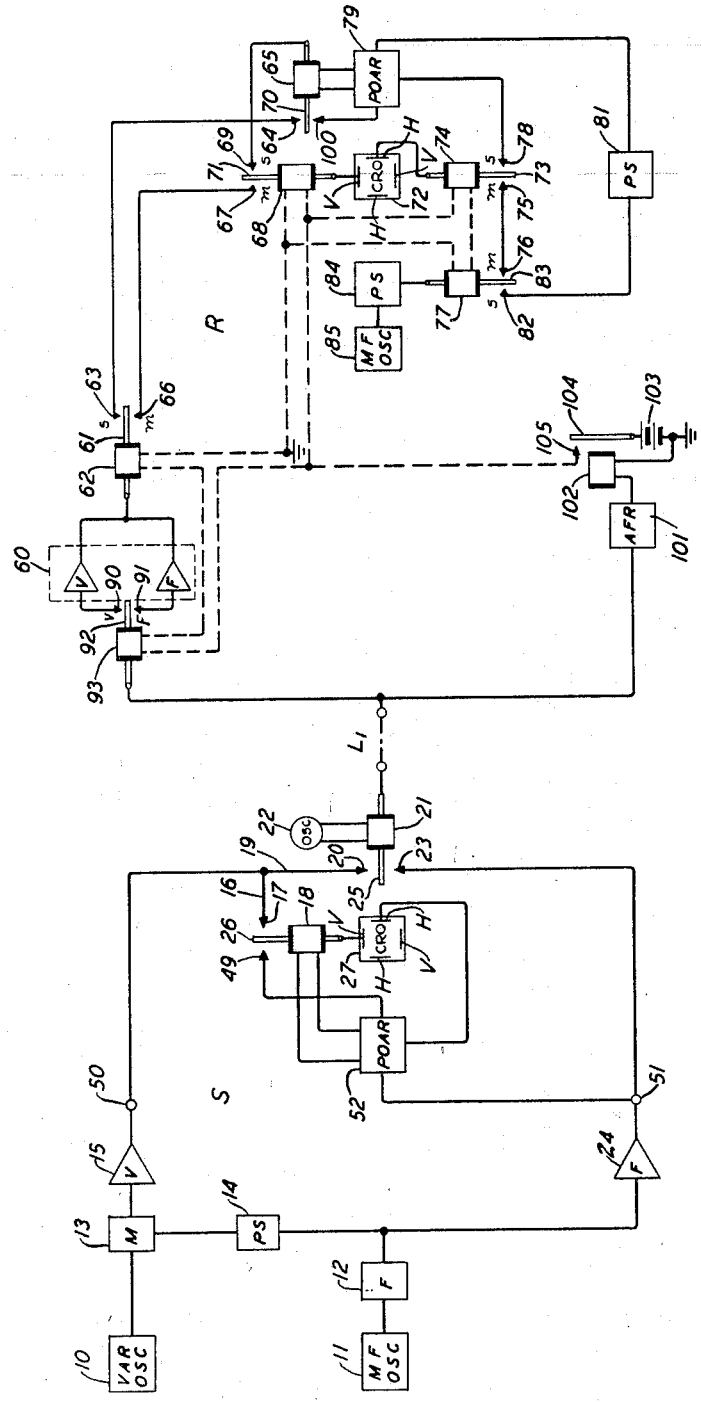
Fig. 1 is a schematic circuit diagram of a system for measuring the envelope delay of a circuit employing a single non-reversible line.
Figure 12:
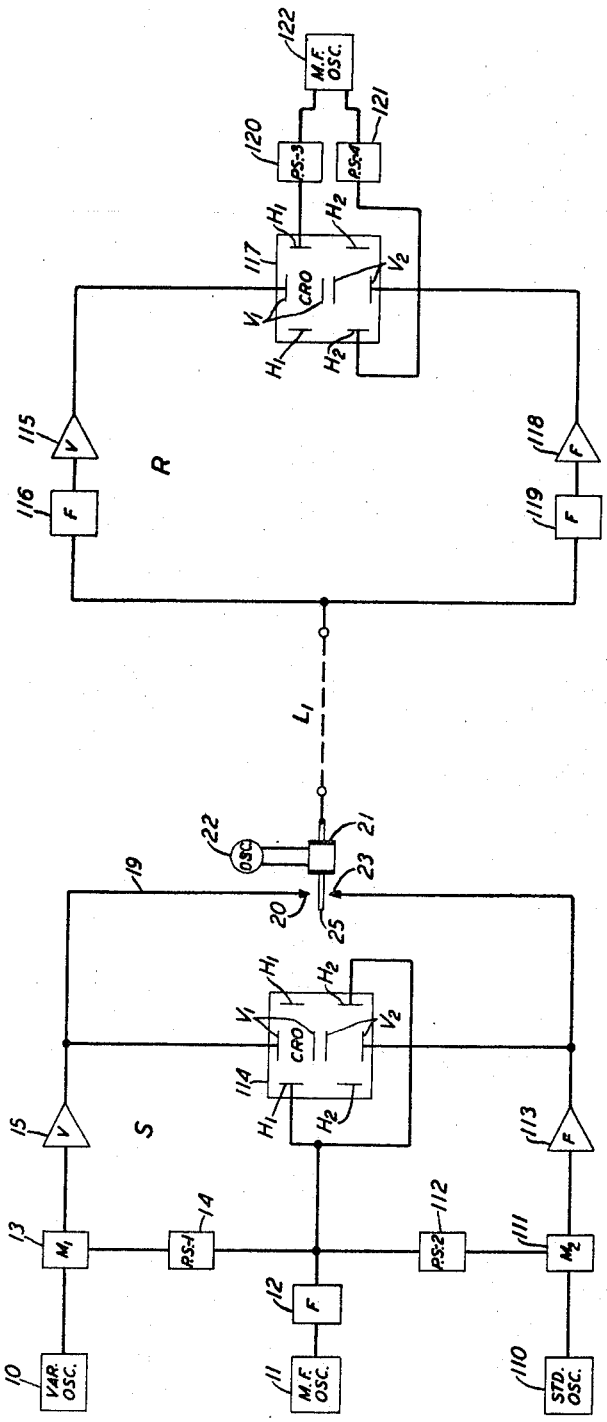

Figs. 3 to 11, inclusive, are diagrammatic and graphical representations to aid in explaining the operation of the circuit shown in Fig. 1;

Fig. 12 is a schematic circuit diagram of another system for measuring the envelope delay of a circuit employing a single non-reversible line; and Figs. 13 to 20, inclusive, are patterns obtained on the screens of the phase comparers in the system of Fig. 12.

Referring more specifically to the drawings, Fig. 1 shows, by way of example for purposes of illustration, an arrangement for measuring the envelope delay of a single non-reversible circuit $L_1$. The arrangement shown in Fig. 1 provides for the intermittent application of a first wave, which is a modulated wave obtained by modulating a wave of the carrier or measuring frequency at which the envelope delay is to be measured with a modulating fixed frequency wave, and a second wave, which is an unmodulated wave of the modulating fixed frequency, to the circuit at the sending end after synchronizing the two waves so that the envelope of the modulated wave and the modulating frequency wave are in phase. Trains of these two waves are intermittently and alternately sent over the circuit $L_1$ whose envelope delay it is desired to measure. The two received waves are then synchronized at the receiving end in a manner similar to that in which they are synchronized at the sending end and these two trains of waves are intermittently applied to a cathode ray phase comparer.

In order to explain more clearly the principles involved in the comparison of a modulated wave and a sine wave of the fixed frequency without the detection of the modulating wave from the modulated wave, reference will now be made to Figs. 2 to 11, inclusive.

Figure 2:
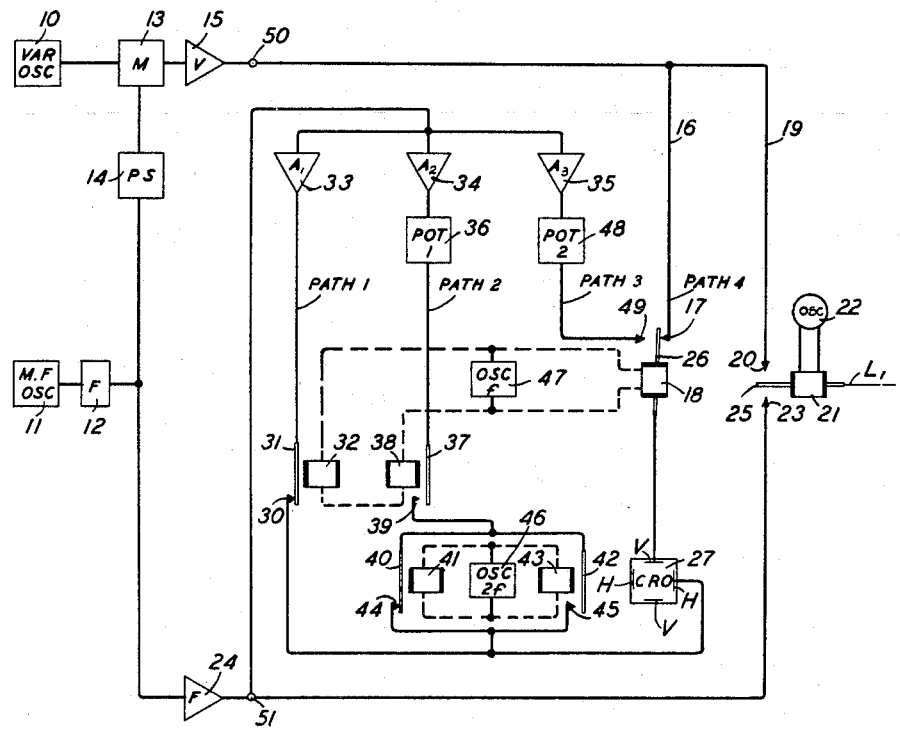
Fig. 2 is a schematic diagram in greater detail of the sending end of the system shown in Fig. 1.
Figure 3:
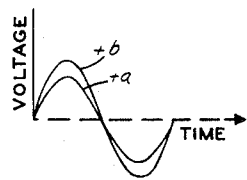
Figure 4:
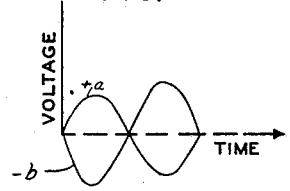

Referring now to Fig. 2, which is a diagram of the sending end of the system of Fig. 1 and which shows in greater detail the portion of the sending end equipment between terminals 50 and 51 of the system more schematically shown in Fig. 1 (a large portion of this equipment being indicated schematically in Fig. 1 by the box 52 marked POAR (potentiometers, oscillators, amplifiers and relays), a sine wave from a variable oscillator 10, which produces waves of measuring frequency, is modulated by a sine wave from a modulating fixed frequency oscillator 11 by means of the modulator 13. A filter 12 and a phase shifter 14 are connected between the modulator 13 and the modulating fixed frequency oscillator 11. The purpose of the filter 12 is to suppress harmonics of the modulating frequency. The output of the modulator 13 is applied through a variable amplifier 15 (that is, an amplifier which can amplify a wide band of frequencies) and the connection 16 to contact 17 of the relay 18 and by means of the amplifier 15 and the connection 19 to the contact 20 of the relay 21. An oscillator 22 of suitable low frequency is connected to the windings of the relay 21 and operates the armature 25 between the contacts 20 and 23 periodically. The contact 23 is connected through a fixed amplifier 24 back to the modulating fixed frequency oscillator 11. By this means a sine wave from the oscillator 11 can be applied directly through the lower contact 23 and the armature 25 of the relay 21 to the line L₁ when the armature makes contact with the lower contact 23.

The armature 26 of the relay 18 is connected to the vertical plates V of the cathode ray oscillograph 27, the horizontal plates H being connected through contact 30 and armature 31 of the relay 32 to an amplifier 33 which receives current from the modulating frequency oscillator 11 through the filter 12 and the fixed frequency amplifier 24. Connected in parallel paths with the path containing the amplifier 33 are the amplifiers 34 and 35. The amplifier 34 is connected (path 2 in the drawings) through a first potentiometer 36 and the armature 37 and contact 39 of the relay 38 to the armature 40 of the relay 41 and the armature 42 of the relay 43. The contact 44 of the relay 41 and the contact 45 of the relay 43 are connected together and to the horizontal plates H of the cathode ray oscillograph 27. The coils of the relays 41 and 43 receive current from an oscillator 46, the frequency of which is twice that of the low frequency oscillator 47 which supplies current to the windings of relays 32, 38 and 18. The amplifier 35 is connected through a second potentiometer 48 to the contact 49 of the relay 18.

Referring now to the receiving end of the system shown in Fig. 1, the line L₁ is connected to two paths, one of which may be traced through the relay 93 and the variable or fixed portions of the amplifier 60 to the armature of a relay 62. The armature 92 of the relay 93 is actuated between the variable contact 90 and the fixed contact 91 by means of the relay 102 the winding of which is connected in the other of the two paths from the line L₁. The contact 63 of the relay 62 is connected to the contact 64 of the relay 65, while the contact 66 of the relay 62 is connected to the contact 67 of the relay 68, contact 69 of the relay 68 being connected to the armature 70 of the relay 65. The armature 71 of the relay 68 is connected to the vertical plates V of the cathode ray oscillograph 72 the horizontal plates H of which are connected to the armature 73 of the relay 74. The contact 75 of the relay 74 is connected to the contact 76 of the relay 77 while the contact 78 of the relay 74 is connected to the box POAR designated by the reference character 79 and which represents a combination of potentiometers, oscillators, amplifiers and rectifiers which is similar to the equipment used at the sending end and designated by the box having the reference character 52 affixed thereto (see Fig. 2 for details). The box 79 is also connected to the winding of the relay 65, to the contact 100 of the relay 65, and through a phase shifter 81 to the contact 82 of the relay 77. The armature 83 of the relay 77 is connected through a phase shifter 84 to a modulating fixed frequency oscillator 85 of any suitable form and which generates oscillations of the same frequency as that of the oscillator 11 at the sending station. During the interval when the modulating frequency wave from the oscillator 11 is transmitted (sine wave) over the line L₁, the armature 92 of the relay 93 is moved to the fixed position F which, in turn, connects the fixed portions of the amplifier 60 in series with the line L₁ and the armature 61 of the relay 62 for transmission of this wave to the cathode ray oscillograph. When the armature 92 is in the V position the modulated wave is correspondingly transmitted through the variable part of the amplifier 60.

The second path to which the line L₁ is connected comprises a box 101 designated in the drawings by the letters AFR which represent a combination of amplifier, filter and rectifier. This box 101 is connected to the winding of the relay 102, this winding being connected to ground and through a source of potential 103, the armature 104, the contact 105, and the windings of relays 93 and 62 to ground. The windings of relays 68, 74 and 77 also receive current from battery 103 when a connection is made between the contact 105 and the armature 104 of the relay 102.

Figure 5:
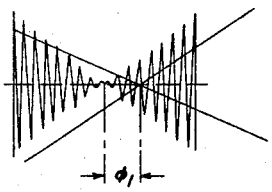
Figure 6:
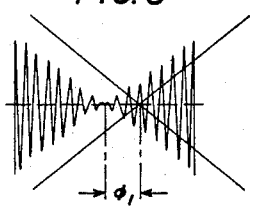
Figure 7:
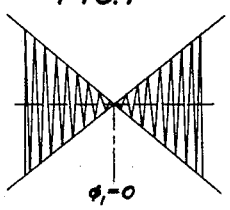

The operation of the system shown in Fig. 1 will now be explained. A modulated wave from the modulator 13 (measuring frequency wave from the oscillator 10 modulated by the fixed frequency wave from the oscillator 11) is supplied to the vertical plates V of the cathode ray tube 27 (see Fig. 2) through the connection 16, the armature 26 of the relay 18 making contact with the contact 17 during this time interval (as shown in Fig. 2). At the same time the sinusoidal wave from the modulating frequency oscillator 11 is supplied to the horizontal plates H of the same cathode ray tube 27 through a circuit comprising amplifier 24, amplifier 33 (see Fig. 2), and armature 31 and contact 30 of the relay 32. At this time the contacts of the relay 38 remain open. For the interval during which the armatures of the relays 32 and 18 remain as shown in Fig. 2, the pattern of the modulated wave with its sinusoidal time base appears as indicated by Figs. 5, 6 and 7, neglecting for the moment the intersecting lines shown in these figures. When the current wave in the low frequency oscillator 47 (Fig. 2) reverses its direction, the relay 32 opens, the relay 38 closes and the armature of the relay 18 moves to the left to contact the contact member 49 of the relay 18. This operation removes the modulated wave from the vertical plates of the oscillograph 27 and in its place applies the modulating frequency wave through path 3 comprising the amplifier 24, the amplifier 35, the potentiometer 48, and the contact 49 and the armature 26 of the relay 18 to the vertical plates V of the cathode ray oscillograph 27. The same modulating frequency is applied to the horizontal plates H through a path comprising the amplifier 24, the amplifier 34, the potentiometer 36, the armature 37 and the contact 39 of the relay 38, and one of the other of the contact mechanisms of relays 41 and 43. These relays 41 and 43 are caused to vibrate at twice the frequency of the oscillator 47 by means of the oscillator 46 and serve to reverse the polarity of the applied potential to the horizontal plates H of the oscillograph 27.

Figure 8:
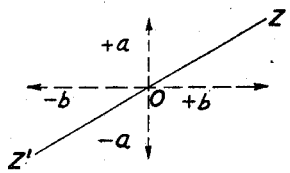
Figure 9:
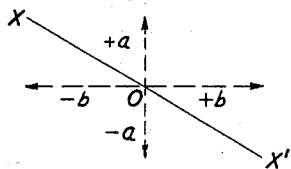
Figure 10:
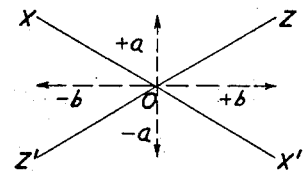

With the armature of the relay 18 in its left-hand position and the contacts of the relay 38 closed, let the contacts of the relay 41 be closed and those of the relay 43 be open. While the armatures of these relays are in these positions let the potentials applied to the vertical and horizontal plates of the cathode ray oscillograph be represented by the curves $+a$ and $+b$ of Fig. 3. During the positive half of the cycle the trace shown by OZ, Fig. 8, is made and during the negative part of the cycle the trace OZ' is shown on the screen. As there are a number of such positive and negative values of these two waves, the complete trace ZZ' is observed by the eye on a screen of the cathode ray oscillograph 27 due to the persistence of vision. However, while relays 38 and 18 still remain with their contacts in this position, the contacts of the relay 41 open and those of the relay 43 close, thus reversing the potential of the voltage wave $b$ (see Fig. 4) and the trace OX (see Fig. 9) is formed on the screen of the oscillograph 27. On the remainder of the cycle for these waves the trace OX' is outlined. As these waves go through several cycles, the eye detects the entire trace XX'. Thus for one complete cycle of operation of the relays 41 and 43 the combined diagonals as shown by Fig. 10 are traced. Consequently, it becomes obvious that a succession of three patterns appears on the screen of cathode ray oscillograph 27, first the modulated wave with its sinusoidal time axis, second the trace ZZ', and third the trace XX'. In practice, due to the persistence of vision effect, the eye can only distinguish the combined pattern as shown by Figs. 5 to 7, inclusive.

The procedure for the phase comparison of the modulated wave with its sinusoidal modulating frequency may be described as follows with reference to Figs. 5 to 7, inclusive. Having first established the combined pattern on the oscillograph screen, let the result be indicated by Fig. 5. It is observed that the envelope (that is, lines drawn through the peak points of the plotted modulated wave) comprises straight lines. Of course, these will only be straight line edges when the modulating frequency is sinusoidal. Also the modulated pattern will have two shapes, depending upon the kind of modulation employed. The case shown is represented by $\cos \omega t \cos \Omega t$. The right or left half of the pattern would disappear from modulations of the type $\cos \omega t (1+\cos \Omega t)$. In Fig. 5 it is observed that a displacement indicated by $\phi_1$ occurs between the intersection of the diagonal and the intersection of the envelope lines. It can also be noted that the diagonals are not parallel to the edges of the envelope. By adjusting the magnitudes of the potentials of the modulating waves applied to the horizontal and vertical plates by means of potentiometers 36 and 48, respectively, these diagonals can be set parallel to the envelope lines as shown in Fig. 6. The same displacement $\phi_1$ will, however, be observed to exist. By adjusting the phase shifter 14, the modulated wave pattern can be shifted to the right and finally be made to take the position and appearance indicated by Fig. 7, that is, the intersecting diagonals lie directly along the envelope lines. For this explanation only the front portion of the modulated wave is shown. Actually there is a corresponding background pattern so that the complete pattern appears as two modulated waves wrapped around a cylinder in such manner that if the phase in the modulating frequency wave is changed by means of the phase shifter 14, the foreground part of the modulated wave pattern can be made to appear as though it were moving either to the right or to the left depending upon the change in phase caused by the phase shifter 14.

Figure 11:
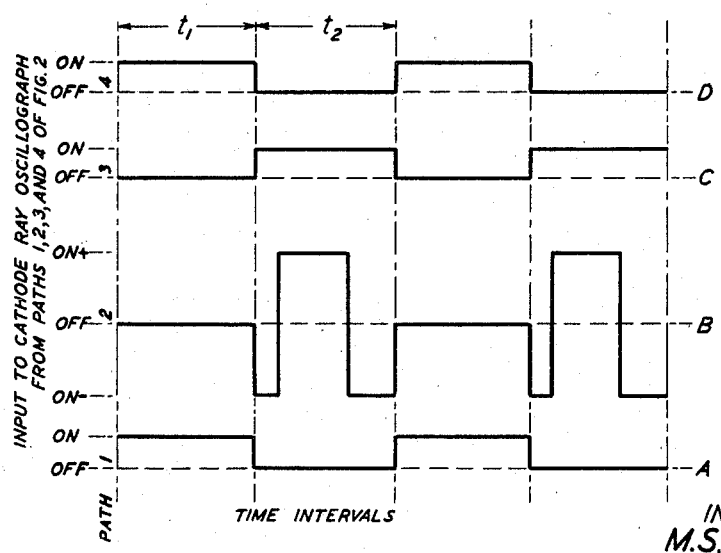

The operation of the sending end equipment shown in Fig. 2 is independent of exact synchronized action of the relays 32, 38, and 18 operating at the same time as one group and 41 and 43 as another group, which two groups of relays are associated with the low frequency oscillators 47 and 46, respectively. The relation between the relay time intervals and the potentials applied to the deflecting plates of the cathode ray oscillograph 27 through the various paths of Fig. 2 is made clear in Fig. 11 in which the input to the plates of the cathode ray oscillograph 27 from paths 1, 2, 3, and 4 in Fig. 2 are plotted against time intervals $t_1$ and $t_2$. During time interval $t_1$, Fig. 11 shows that the waves already described are being transmitted over paths 1 and 4 to the cathode ray oscillograph. During the time interval $t_2$, there is no transmission over paths 1 and 4 as shown in Fig. 11 by the zero input for these paths. However, during interval $t_2$, the modulating wave only is transmitted over paths 2 and 3 to give the intersecting line XX' and ZZ' already described. It should be noted also that should like changes in phase of the modulating waves occur as the result of traversing paths 2 and 3, this will not alter the intersecting line picture since the eye cannot distinguish this phase difference, if any, between the waves in paths 2 and 3, which waves are indicated in Fig. 11. In connection with Fig. 2 it will be apparent that the outputs from the amplifiers 33, 34, and 35 should be in phase with each other. With the circuit connected as shown in Fig. 1, the modulated wave and the modulating wave are placed in phase according to the procedure described above and then intermittently and alternately sent over the circuit $L_1$. This constitutes the sending end calibration or a reduction of the delay difference between these two waves to zero.

Suppose the first train of waves to be received is one of the modulating frequency. A component of this wave operates relay 102 after going through the equipment in the box 101 labeled AFR (combination of amplifier, fixed filter and rectifier). This operation puts battery on the various relay windings shown connected by the dotted line and their respective armatures move to the M position, the armature of relay 93 going to the F position which denotes a fixed setting for the amplifier. With these connections the modulating wave is applied to the vertical set of plates V of the cathode ray oscillograph 72. At the same time another wave from the fixed frequency oscillator 85 having the same frequency is applied to the horizontal plates H of the oscillograph through the phase shifter 84 and the armatures and contacts of the relays 77 and 74. The phase shifter 84 is adjusted and these waves are in phase with each other when the pattern on the screen reduces to a straight diagonal line, the pattern being an ellipse when they are not in phase with each other.

When the train of modulated waves appears during the next time interval, the relay 102 releases and the armatures already mentioned move to the S contacts and relay 93 moves to the V position, which are the normal locations for the various armatures of these relays. The relay 65 is operated at some low frequency from the equipment inside the box 79 designated in the drawings POAR and which, as pointed out above, is similar to the box 52 at the sending station S. When the relay armature 92 is in the upper position, its normal location, the modulated wave is applied through relays 65 and 68 to the vertical plates V of the oscillograph 72. At the same instant, however, the relay 77 remains in the S position so that the wave from the fixed frequency oscillator 85, which is in phase with and at the same frequency as the transmitted modulating wave, its phase having been adjusted previously by the phase shifter 84, is applied to the horizontal plates H of the oscillograph 72 through the phase shifter 81. It is the wave from this oscillator 85 which is used in connection with the modulated wave for the final comparison. From here on the method of comparison becomes identical with that already described above in connection with the sending station.

The readings of the phase shifter may be calibrated to give the envelope delay (generally expressed in seconds) for any frequency of the variable oscillator 10. The envelope delay is given in terms of the difference of the readings of the two phase shifters at the receiving end of the line. Any delay caused by amplifiers or filter may be obtained by the well known "loop" method and subtracted. Additional readings are taken at other values of frequencies to determine the frequency envelope delay characteristic of the circuit or apparatus.

By way of example, the modulating fixed frequency oscillator 11 may generate a sine wave of a fixed frequency of, for example, 10,000 cyles per second, while the oscillator 10 may generate measuring frequency sine waves for testing purposes of, for example, from 100 kilocycles to 1 to 2 megacycles per second. The oscillator 85 is of the same frequency as the modulating fixed frequency oscillator 11 and thus generates a fixed frequency of, for example, 10,000 cycles per second. The frequency of the oscillator 22 is, for example, 30 cycles per second and that of the oscillator 47 is, for example, 20 cycles per second. The frequency of the oscillator 46 is, of course, twice that of the oscillator 47 and is, for example, 40 cycles per second.

The principles already explained for the comparison of a modulating sine curve and the resulting carrier envelope without detection of the modulating wave from the modulated wave, and as illustrated in the circuit connection shown in Fig. 1 and related figures, have been shown and described in this manner to demonstrate clearly the process involved. It is obvious that there are a variety of circuits which will accomplish the comparison of the two waves involved in the same manner. It is also obvious that the method described above may be used for the phase comparison of the input and the output of a modulator, that is, between a modulating wave and the envelope of the modulated wave.

In some cases, the circuit $L_1$ may not be suitable for transmission of the modulating wave whose frequency is much lower than that of the carrier (measuring frequency). Two alternatives are available. One is to use an auxiliary circuit capable of conducting the modulating wave and the other is to modulate a fixed standard carrier frequency and send the resulting envelope intermittently and alternately with the original envelope. This latter method of comparing the phase of two envelopes will be considered below in connection with the system of Fig. 12.

In Fig. 12 there is shown a system in which two modulated waves are transmitted either intermittently or simultaneously over the line $L_1$ whose envelope delay it is desired to measure and which are phase compared without demodulation at the receiving station. In Fig. 12 certain elements of the circuit are similar to corresponding elements in Fig. 1 and are, therefore, referred to by the same reference characters. In the arrangement shown in this figure, a wave from the variable (measuring frequency) oscillator 10 is modulated by means of the modulator 13 with a wave of the modulating fixed frequency from the oscillator 11 which is connected by means of a filter 12 and a phase shifter 14 to the modulator 13. Similarly, a sinusoidal wave from a standard oscillator 110 (of, for example, 50 kilocycles per second) is modulated with the wave from the oscillator 11 by means of the modulator 111, a phase shifter 112 being connected in the path between the oscillator 11 and the modulator 111. The output waves of the modulators 13 and 111 are connected through amplifiers 15 and 113, respectively, to the contacts 20 and 23 of the relay 21, the windings of which are energized by a sine wave from the oscillator 22. The output circuit from the amplifier 15 is also connected to one pair of vertical plates $V_1$ in a special cathode ray tube having two electron guns and two complete sets of electrostatic deflecting plates therein, while the output circuit of the amplifier 113 is connected to the pair of deflecting plates $V_2$ of the second of said sets of deflecting plates in tube 114. Both pairs of horizontal deflecting plates $H_1$ and $H_2$ are connected to the modulating fixed frequency oscillator 11 through the filter 12, the connections to the plates $H_2$ being reversed with respect to those to the plates $H_1$. The cathode ray device 114 may be a tube of any suitable form having two guns and two complete sets of deflecting plates to produce screen patterns which are superimposed one upon the other, or it may be a tube arrangement of the form disclosed in Fig. 2 of Patent 2,083,203, issued June 8, 1937, to Schlesinger wherein each beam traverses a separate area on the screen of the tube having two complete electron gun and deflecting systems therein but the images of these two separate areas are mirrored upon and superimposed on a single area on a viewing screen. While the Schlesinger arrangement is intended for color television, it is obvious that the electron gun and optical systems thereof may be used for other purposes, such as in applicant's system of Fig. 12.

In the arrangement shown in Fig. 12 the two modulated waves are intermittently and alternately applied to the line L₁ and are selected by one of the other of the filters 116 and 119 in different paths at the receiver station R, amplifiers 115 and 118 being also respectively used in these two paths. The filter 116 selects the wave containing the carrier wave of the measuring frequency while the filter 119 selects the wave containing the carrier wave of standard frequency (from the oscillator 110). The output wave from the filter 116 is, after amplification, applied to one pair of vertical deflecting plates V₁ of the cathode ray oscillograph 117 which may be, and preferably is, similar to the cathode ray oscillograph 114 at the sending station S, while the output wave from the filter 119 is, after amplification, applied to the set of deflecting plates V₂ of the tube 117. The horizontal deflecting plates H₁ corresponding to the vertical deflecting plates V₁ are connected through a phase shifter 120 to a modulating fixed frequency oscillator 122 while the deflecting plates H₂ corresponding to the vertical deflecting plates V₂ are connected through a phase shifter 121 to the modulating fixed frequency oscillator 122. As in the case of the sending end, the connections to the plates H₂ are reversed with respect to those of the plates H₁.

Figure 13:
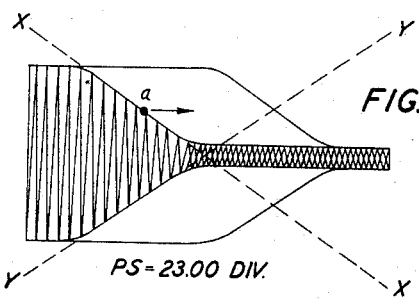
Figure 14:
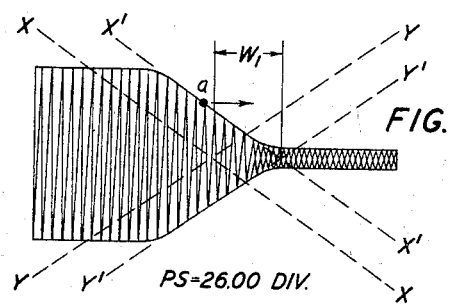
Figure 15:
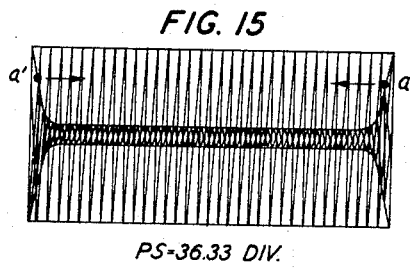
Figure 17:
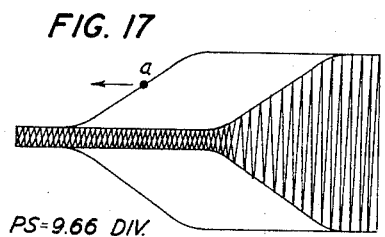
Figure 18:
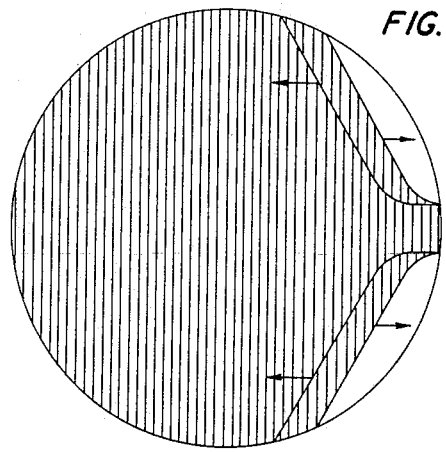
Figure 19:
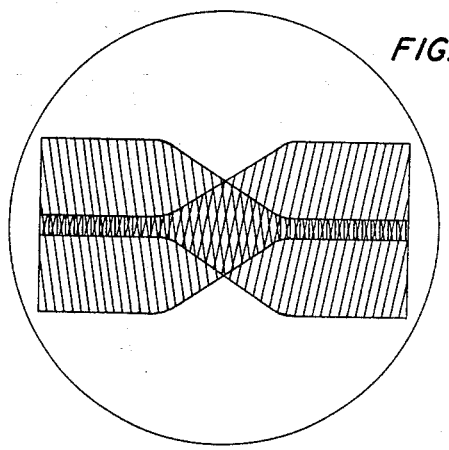
Figure 20:
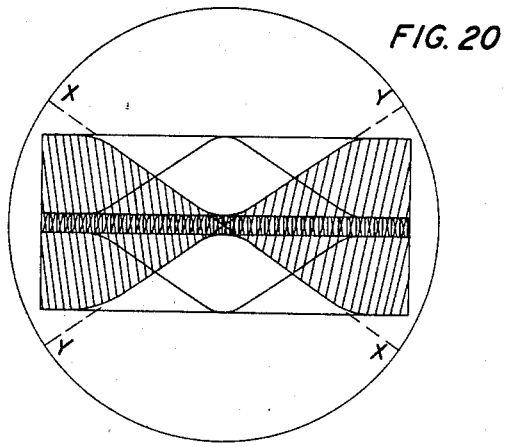

Reference will now be made to Figs. 13 to 20, inclusive, which show various patterns which appear on the screens of the cathode ray oscillographs 114 and 117 or upon an external screen upon which these patterns are projected and superimposed. Figs. 13 to 17, inclusive, show various envelope patterns for various phase shifter settings where 40 divisions on the phase shifter are equal to 360 degrees. When the phase comparison of two modulated waves is made, the patterns of Figs. 13 and 14 are very useful and may be used in accordance with the intermittent application of patterns on the cathode ray oscillograph screen. (The flat upper and lower portions shown in the patterns of Figs. 13 and 14 and in Figs. 15 to 20, inclusive, are due to a certain amount of circuit distortion, but this distortion does not detract from the comparison principles involved.) When comparison of two modulated waves is necessary, one may be adjusted by a phase shifter to give a pattern like Fig. 14 and the other modulated wave pattern may be turned over 180 degrees to appear like the pattern of Fig. 16. When these two waves are intermittently applied by a relay commutation device or by any other means accomplishing this purpose, or one wave is applied using one set of horizontal and vertical plates and the second wave is applied using another set of horizontal and vertical plates in the same oscillograph tube (as in Fig. 12), the pattern shown by Fig. 19 will result in either case. (It will be understood that any slight phase changes that occur inside the tube caused by the electron beam traversing the distance between plates may be easily compensated for by well-known methods, not only in this particular instance, but in all cases described herein which make use of the cathode ray oscillograph for the measurement of envelope delay.) In Fig. 19 the two modulated waves are 180 degrees out of phase with respect to each other when their respective edges are superimposed (that is when the edges of the foreground pattern coincide with those of the background pattern). Fig. 20 shows a second method of comparing two envelopes using the patterns of Figs. 13 and 17 when they are likewise intermittently applied, together with the two intersecting straight lines XX and YY formed by the modulating frequency wave to give the reference position for each envelope. The pattern of Fig. 20 is merely that of Fig. 13 superimposed upon the pattern of Fig. 17.

Figure 16:
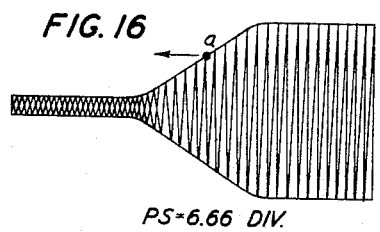

Referring now in greater detail to Figs. 13 to 20, inclusive, Figs. 13 to 17 show several important positions of the envelope relating to the measurement of delay. Fig. 13 corresponds very nearly to a phase shifter reading of 23 divisions where, as pointed out above, 40 such divisions equal 360 degrees. In order to see clearly the movement of this pattern as it assumes different positions for a complete revolution, point $a$ is shown on one edge of the envelope moving from left to right from the initial setting of 23.00 divisions of the phase shifter. By advancing the phase shifter only 3 divisions to 26.00 the edge containing point $a$ becomes superimposed upon the edge parallel to it and the pattern is shown by Fig. 14. When the edges are straightlined and symmetrical this pattern is an important one from the standpoint of simplicity of apparatus involved in the measurement of envelope delay. When the phase shifter is advanced to 36.33 divisions point $a$ is in the background of the pattern and very near the right edge. When the phase shifter passes through its maximum of 40 and on to 6.66 (or, in other words, is advanced 10.33 divisions) the pattern is shown by Fig. 16. This corresponds to Fig. 14 advanced 180 degrees. By increasing the phase shifter to 9.66 divisions, the pattern shown by Fig. 17 is obtained. This likewise corresponds to Fig. 13 advanced 180 degrees. Now by advancing the phase shifter 10.33 divisions, Fig. 17 becomes Fig. 15 where point $a$ is in the foreground and moving to the right. A further advancement of 3 divisions completes the cycle and point $a$ returns to its position in Fig. 13. From this it becomes evident that there is greater sensitivity when the pattern is one like that shown in Fig. 13 or Fig. 14.

Greater enlargement from a practical viewpoint may be obtained by using the pattern shown in Fig. 18, the enlargement being obtained by increasing the voltage applied to the horizontal and vertical plates of the cathode ray oscillograph. When so enlarged the comparison edges appear on the right side of the screen as shown in Fig. 18. More of these edges can be obtained by giving the envelope a direct current displacement to the left.

The method of operation of the system shown in Fig. 12 is as follows: Modulated waves are generated in the modulators 13 and 111 and phase shifters 14 and 112 serve to make slight adjustments for the purpose of adjusting delay differences to zero between the two modulated waves before application to the line L₁. The more desirable patterns of the envelope to be obtained on the cathode ray oscillograph 114 at the sending end (having double sets of horizontal and vertical deflecting plates) are those shown by Figs. 14 and 16. Each of the two foreground patterns is lined up with its background pattern and the final pattern when the two modulated waves are 180 degrees out of phase with each other is shown in Fig. 19. The modulated waves are viewed 180 degrees out of phase but are applied to the sending end of the line L₁ in phase with each other, thus eliminating the calibration of all sending end apparatus. The 180 degrees phase reversal is obtained by merely connecting the modulating frequency source to the opposite horizontal plate from the connection made to the other horizontal plate as shown at the sending end in Fig. 12. These two modulated waves may be transmitted intermittently by means of the relay 21 or they may be transmitted simultaneously, thus eliminating the relay 21. In either case the two modulated waves at the receiving end of the line are separated by means of the action of the filters 116 and 119 and each modulated wave is applied to one set of vertical plates of the cathode ray oscillograph 117 (equipped with two sets of horizontal and vertical deflecting plates). A standard oscillator 122 giving a frequency output equivalent to that of the modulating frequency is fed through the two phase shifters 120 and 121 to each of the two sets of horizontal plates of the oscillograph 117, except that the connection must be similar to the way it is connected at the sending end in order that the resulting patterns will be similar to those shown by Fig. 19. Adjustment of each of these phase shifters 120 and 121 may be made to align the edges of the patterns for comparison purposes. In the event that intermittent application of the wave at the sending end is used, obviously only one pattern will appear at a time and in some cases this might be desirable from the standpoint of the judgment of the operator making the comparison. An intermittent action at intervals of, for example, 5 seconds will give a sufficient time interval for comparison and still not detract from the accuracy of the measurements due to the waves having slight drifting action, if any. Local calibrations, using the well-known "loop" method of measuring envelope delay, may be made for the amplifiers and filters at the receiving end of the line.

The envelope delay for the particular value of measuring frequency considered is obtained from the difference in readings of the two phase shifters at the receiving end of L₁. Any delay caused by the filters and amplifiers at the receiving end may be subtracted. The envelope delay characteristic of L₁ is obtained by taking additional measurements at other measuring or carrier frequencies within the desired frequency range.

Various modifications may be made in the embodiments disclosed above without changing the spirit or the scope of the invention, as indicated in the appended claims.

What is claimed is:

1. The method of measuring the envelope delay of a transducer comprising the steps of transmitting over the transducer a first modulated wave produced by modulating a wave of a measuring frequency with a wave of fixed frequency and a second modulated wave produced by modulating a wave of a standard frequency with a wave of said fixed frequency, and comparing the phase of said two modulated waves without demodulation at the receiving end of said transducer by comparing the phase of each with that of a sinusoidal wave.

2. The method of measuring the envelope delay of a transducer comprising the steps of forming a first modulated wave by modulating a wave of a measuring frequency with a wave of fixed frequency and forming a second modulated wave by modulating a wave of a standard frequency with a wave of said fixed frequency, shifting the phase of said first modulated wave so that it is in phase with a wave of said fixed frequency, shifting the phase of said second modulated wave so that it is in phase with said wave of fixed frequency, applying said two modulated waves to the transducer, separating the two modulated waves at the receiving end of said transducer, and applying said waves to a phase comparer without demodulation thereof.

3. The method of measuring the envelope delay of a transducer comprising the steps of forming a first modulated wave by modulating a wave of a measuring frequency with a wave of fixed frequency and forming a second modulated wave by modulating a wave of a standard frequency with a wave of said fixed frequency, shifting the phase of said first modulated wave so that it is in phase with a wave of said fixed frequency, shifting the phase of said second modulated wave so that it is in phase with said wave of fixed frequency, intermittently applying said two modulated waves to the transducer, separating the two modulated waves at the receiving end of said transducer, and applying said waves to a phase comparer without demodulation of said waves.

4. The method of measuring the envelope delay of a transducer comprising the steps of forming a first modulated wave by modulating a wave of a measuring frequency with a wave of fixed frequency and forming a second modulated wave by modulating a wave of standard frequency with a wave of said fixed frequency, shifting the phase of said first modulated wave so that it is in phase with a wave of said fixed frequency, shifting the phase of said second modulated wave so that it is in phase with said wave of fixed frequency, applying said two modulated waves to the transducer, separating the two modulated waves at the receiving end of said transducer, applying the two modulated waves without demodulation to separate pairs of deflecting plates in a cathode ray device having two complete sets of four deflecting plates, and applying waves of said fixed frequency to the two sets of plates having axes at right angles to those of the pairs of plates to which the modulated waves are applied.

5. The method of measuring the envelope delay of a transducer comprising the steps of transmitting over the transducer a first wave produced by modulating a wave of a measuring frequency with a wave of fixed frequency and a second wave which is a sinusoidal wave of the fixed frequency, applying said two waves alternately to one of the pairs of plates of a cathode ray oscillograph, and applying a wave of the fixed frequency to the other pair of plates at all times.

6. The method of measuring the envelope delay of a transducer comprising the steps of transmitting alternately and intermittently over the transducer a first wave produced by modulating a wave of measuring frequency with a wave of fixed frequency and a second wave which is a sinusoidal wave of the fixed frequency, applying said two waves alternately to one of the pairs of plates of a cathode ray oscillograph, and applying a wave of the fixed frequency to the other pair of plates at all times.

7. The method of measuring the envelope delay of a transducer comprising the steps of transmitting over the transducer a first wave produced by modulating a wave of measuring frequency with a wave of fixed frequency and a second wave which is a sinusoidal wave of said fixed frequency, applying said waves alternately to one of the pairs of plates of a cathode ray oscillograph, applying a wave of the fixed frequency to the other pair of plates at all times, and reversing the phase of this last-mentioned wave at twice the frequency that the modulated wave and the sinusoidal wave are applied to the other pair of plates.

8. Phase comparing means comprising an electronic beam tube having two sets of deflecting elements for respectively deflecting the beam in two directions transverse to each other and a screen upon which the beam impinges, means for impressing a series of relatively low frequency substantially sine waves of substantially constant amplitude upon one of said sets, means for alternately impressing upon the other of said sets a series of substantially sine waves of the frequency of, and in phase with, the low frequency waves applied to said one set, and a series of high frequency waves the amplitude envelope of which is of the same frequency and wave form as said low frequency waves, means for periodically shifting the phase of one of said low frequency series applied to said sets by 180 degrees at twice the frequency of the alternate application of the high frequency and the low frequency waves to said second set, whereby a pattern is formed on said screen comprising a pair of crossed diagonal lines and a series of high frequency waves having an amplitude envelope comprising two crossed lines, and means for adjusting the relative phase relationship of said high frequency waves to said low frequency waves to cause relative movement between the said pair of crossed diagonal lines and the rest of said pattern.

MONTAGUE S. BURGESS.